United States Patent
McDonald

(12) 
(10) Patent No.: US 6,447,053 B1
(45) Date of Patent: Sep. 10, 2002

(54) CONCRETE BUGGY OPERATOR PROTECTOR

(76) Inventor: Lowell McDonald, 2908 E. 61st St. N., Wichita, KS (US) 67219

(*) Notice: Subject to any disclaimer, the term of this patent is extended or adjusted under 35 U.S.C. 154(b) by 0 days.

(21) Appl. No.: 09/939,930

(22) Filed: Aug. 27, 2001

(51) Int. Cl.7 .............................................. B60R 19/48
(52) U.S. Cl. ............................. 296/190.03; 296/68.1; 293/117; 298/1 C
(58) Field of Search ............................... 293/102, 117; 296/190.03, 68.1; 298/1 C

(56) References Cited

U.S. PATENT DOCUMENTS

D159,877 S  *  8/1950  Whiteman
2,887,339 A  *  5/1959  Reid .............................. 298/9
RE33,131 E  *  12/1989  Morrison .................... 298/1 H

* cited by examiner

*Primary Examiner*—Dennis H. Pedder
(74) *Attorney, Agent, or Firm*—Kenneth Jack

(57) ABSTRACT

A concrete buggy operator protector consisting of a "U" bracket having a rearward end, a left arm, and a right arm, the left and right arms each having a forward end, the rearward end of the "U" bracket in combination with the left and right arms defining an operator protection space; cowl mounting slip pins fixedly attached to the forward ends of the left and right arms of the "U" bracket; an impact column fixedly attached to and extending downwardly from the rearward end of the "U" bracket; and a step mounting slip pin fixedly attached to a lower end of the impact column.

13 Claims, 4 Drawing Sheets

CONCRETE BUGGY OPERATOR PROTECTOR

FIELD OF THE INVENTION

This invention relates to apparatus adapted for protecting equipment operators from crushing impacts. More particularly, this invention relates to apparatus adapted for protecting motorized concrete buggy operators from such injury.

BACKGROUND OF THE INVENTION

Motorized concrete buggies manufactured by companies such as the Wacker Corp. of Menomonee Falls, Wis.; Miller Spreader Co., Inc. of Youngstown, Iowa; or Terex Amida Company of Rockhill, S.C.; typically comprise a forward concrete carrying dump bin pivotally mounted upon an undercarriage frame. Left and right drive wheels are rotatably mounted upon the forward end of the undercarriage frame, and a manually steerable rear wheel is pivotally and rotatably mounted at the rearward end of the undercarriage frame. Typically, a four cycle internal combustion engine is mounted toward the rearward end of the undercarriage frame, rearward of the concrete carrying bin, such motor powering the drive wheels and powering an hydraulic power system for hydraulic cylinder actuated dumping of concrete from the concrete bin. Typically, a protective cowl is fixedly attached to the rearward end of the undercarriage frame, such cowl overlying and shrouding the engine. Such concrete buggies typically have a rotatable steering column extending upwardly from the rear wheel through the undercarriage and through the protective cowling, the upper end of the steering column typically having handle bars attached thereto. The extreme rearward end of such typical concrete buggy has a rearwardly extending rider step upon which an operator may stand while driving the concrete buggy through manipulation of the handle bars and engine controls.

In use, several concrete buggies are commonly utilized at once at a single worksite. Where several concrete buggies are operated simultaneously, queuing lines generally form for filling the concrete buggies at a concrete truck, and for dumping concrete at the site of concrete forms. Such queues expose equipment operators standing on rider stands as described above to crushing impacts resulting from contact with a concrete buggy immediately behind.

The instant inventive concrete buggy operator protector protects such operators by providing a removably attachable frame, including a "U" bracket and an impact column for protecting such operators.

BRIEF SUMMARY OF THE INVENTION

The instant inventive concrete buggy operator protector preferably comprises a tubular steel "U" bracket consisting of a forwardly extending right arm, a forwardly left arm, and a rearward end spanning between the rearward ends of the left and right arms. Preferably, tubular foam padding is disposed around the "U" bracket. Also preferably, the width of the "U" bracket is sufficient to allow an operator to stand between the left and right arms, and preferably the length of the "U" bracket is fitted so that it may co-extensively overlie a typical rider step of a concrete buggy. A tubular steel impact column is preferably fixedly welded to the rearward end of the "U" bracket at its midline, such column preferably being oriented so that it extends vertically downward. Suitably, a plurality of such columns may be utilized. The height of such impact column is preferably co-extensively fitted to the elevation of the rearward lip of the cowl over the rider step.

Cowl mounting means are preferably fixedly attached to the forward ends of the left and right arms of the "U" bracket. A preferred cowl mounting means comprises left and right slip pins. Where the preferred left and right slip pins are utilized slip pin receiving apertures or sleeves are preferably drilled through or welded upon the rearward lip of such concrete buggy cowl for receipt of such slip pins. Suitably, though less desirably, spirally threaded screws, spirally threaded nut and bolt combinations, keyed slide ridge and slide channel combinations, quick disconnect couplings, pin and eye combinations, pin and clevice combinations, or hook and slot combinations may be utilized as the cowl mounting means.

Step mounting means are similarly fixedly attached to the lower end of the impact column. Like the cowl mounting means, the preferred step mounting means comprises at least a first slip pin (and preferably paired slip pins) slidably engageable with slip sleeves or pin receiving apertures located at the rearward end of the rider step of the concrete buggy. Suitably, though less desirable, the step mounting means may comprise spirally threaded screws, spirally threaded nut and bolt combinations, keyed slide ridge and slide channel combinations, quick disconnect couplings, pin and eye combinations, pin and device combinations, or hook and slot combinations.

Preferably, a height adjustable seat in the nature of a bicycle seat is attached to the impact column, such seat helping to stabilize the buggy operator.

In use of the instant inventive concrete buggy operator protector, an operator stands upon the rider step in front of the impact column and between the left and right arms of the "U" bracket. While so positioned, the rider is protected by the impact column and the "U" bracket from rearward collisions with other concrete buggies. Upon storage of the concrete buggy, or upon transportation of the buggy upon a trailer, such protector is conveniently lifted upward, causing its slip pin attachments to disengage from the step and cowl, allowing the rider step to be conveniently pivoted upwardly for compact storage.

Accordingly, it is an object of the present invention to provide a removably attachable barrier frame for protecting operators of motorized concrete buggies.

It is a further object of such invention to provide an operator a convenient operator's seat for stabilizing.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
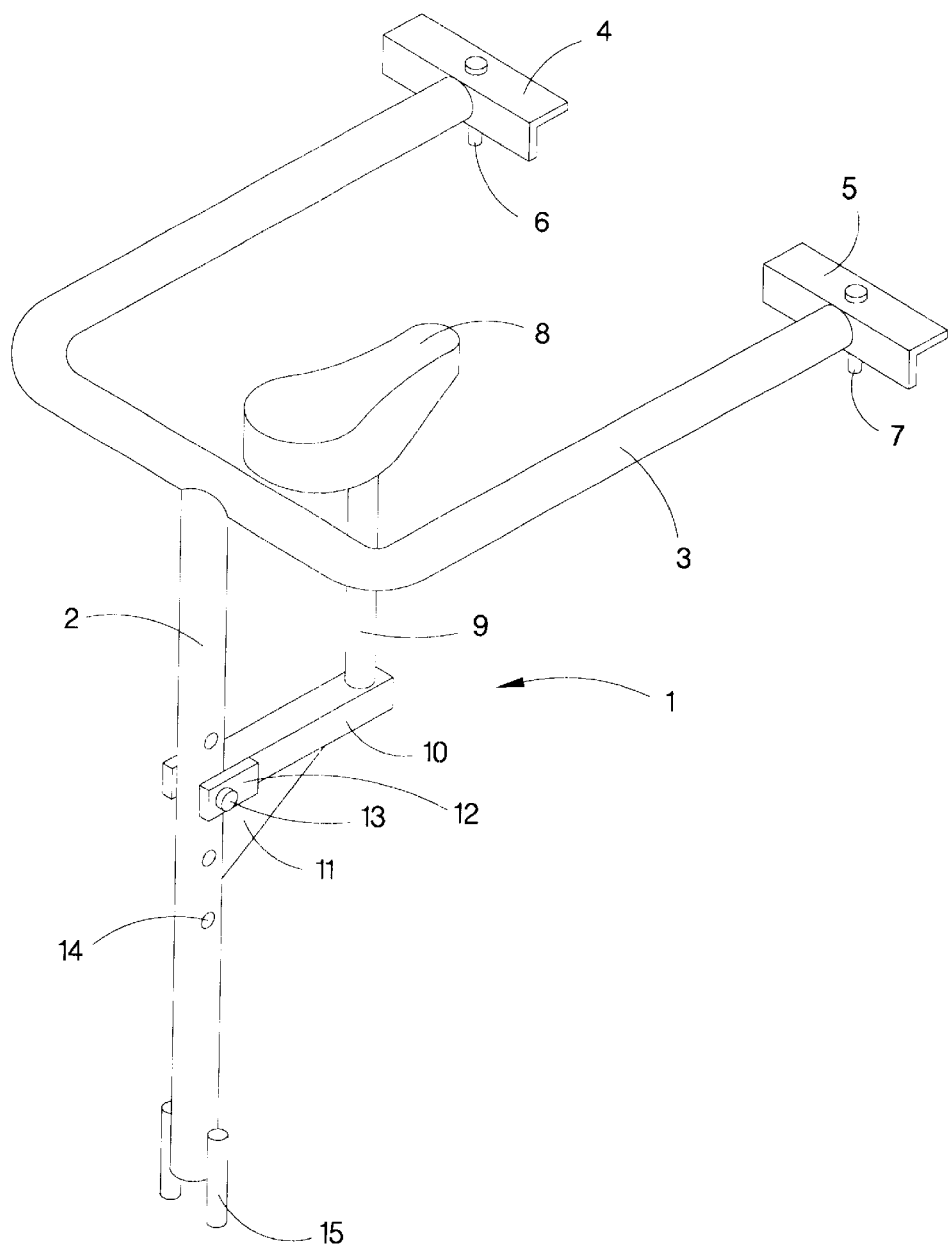
FIG. 1 is an isometric view of a preferred embodiment of the instant inventive concrete buggy operator protector.

Referring now to the drawings, and in particular to FIG. 1, the instant inventive concrete buggy operator protector is referred to generally by reference arrow 1. A major structural component of the protector 1 is a "U" bracket 3, the "U"

bracket preferably comprising left and right arms, and a rearward end spanning between rearward ends of the left and right arms. Angle iron guides 4 and 5 are preferably fixedly welded upon the forward ends of the left and right arms of the "U" bracket 3. Slip pins 6 and 7 are preferably welded to the angle iron guides 4 and 5 so that they respectively extend downwardly from the forwardly extending flanges of angle iron guides 4 and 5.

Referring further to FIG. 1, on upper end of an impact absorbing column 2 is preferably fixedly welded to the rearward end of "U" bracket 3. Preferably, the lower end of impact column 2 has a pair of slip pins 15 fixedly welded thereto.

Referring further to FIG. 1, an operator's seat 8 is preferably vertically adjustably attached to impact column 2. Preferably, seat 8 is supported by a support shaft 9 and cantilevered beam 10, the rearward end of cantilevered beam 10 being adjustably attached to impact column 2 by means of device joint 12 and sheer pin 13. Preferably, impact column 2 has a plurality of pin receiving apertures 14 facilitating vertical adjustment of seat height. Also, preferably, a triangulating brace 11 extends downwardly from cantilevered beam 10, such brace opposing downward pivoting motion of seat 8 about pin 13.

Figure 2:
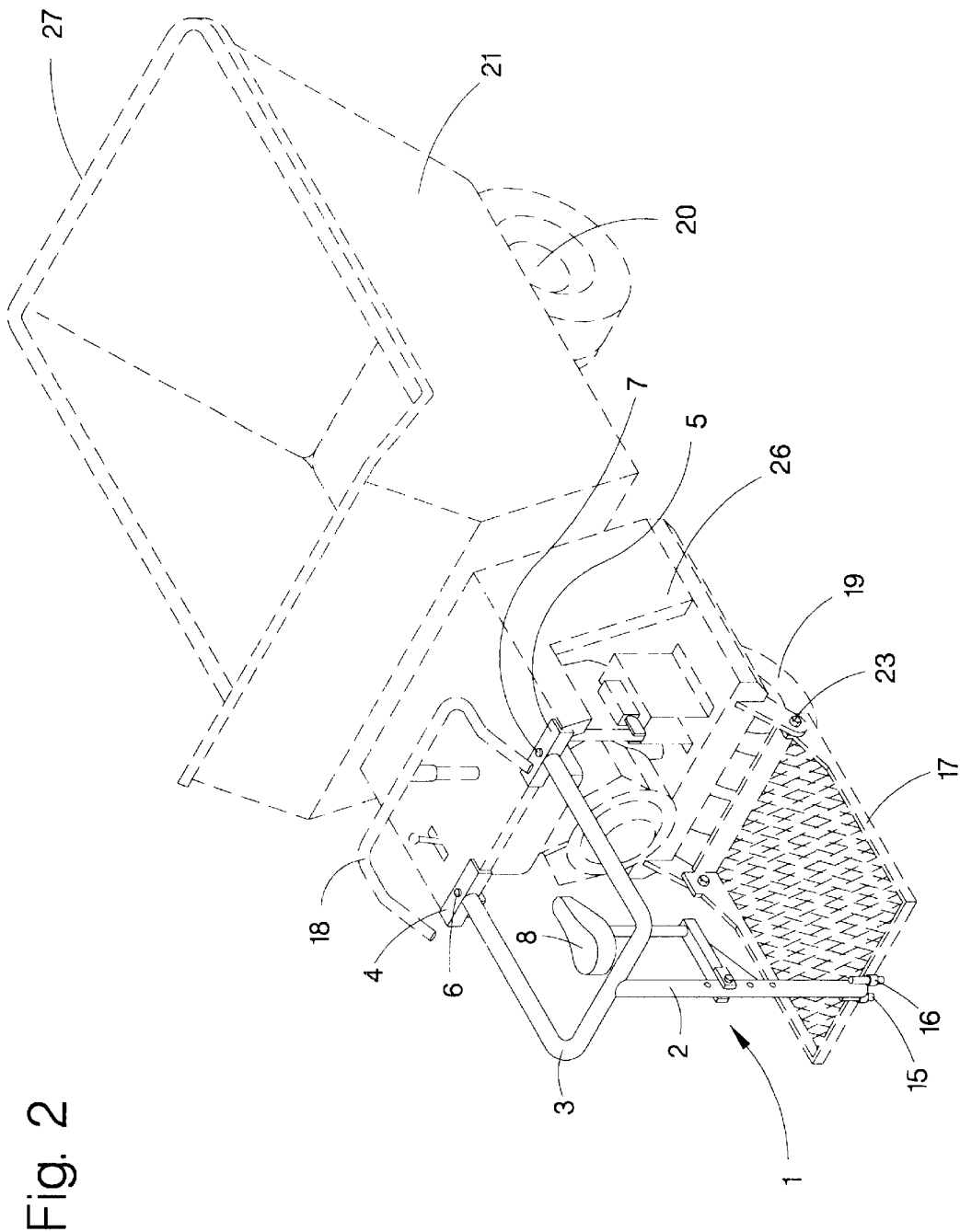
FIG. 2 redepicts the protector of FIG. 1, showing the protector in use upon an exemplary concrete buggy.
Figure 3:
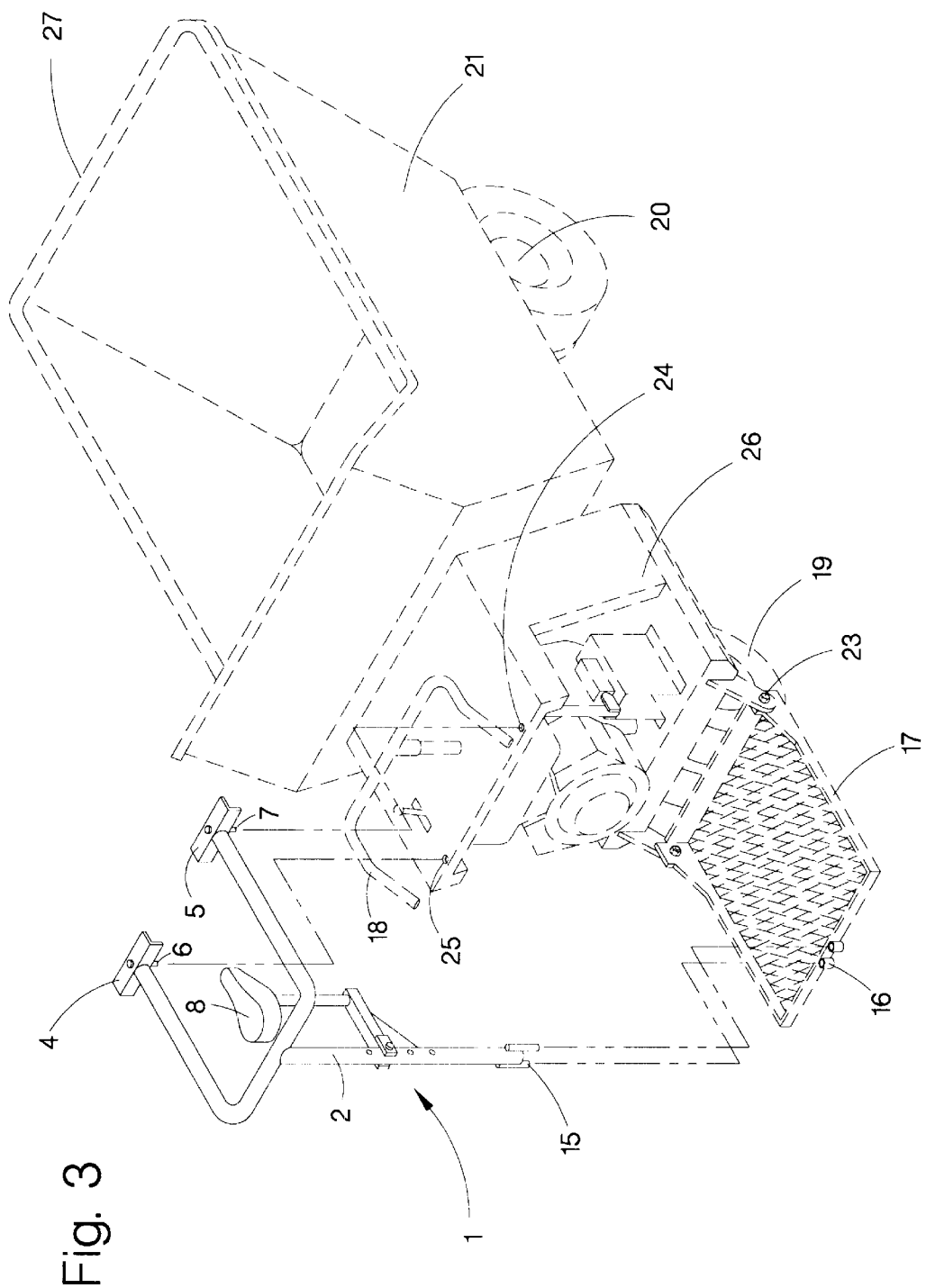
FIG. 3 redepicts the image of FIG. 2, shown in exploded view.
Figure 4:
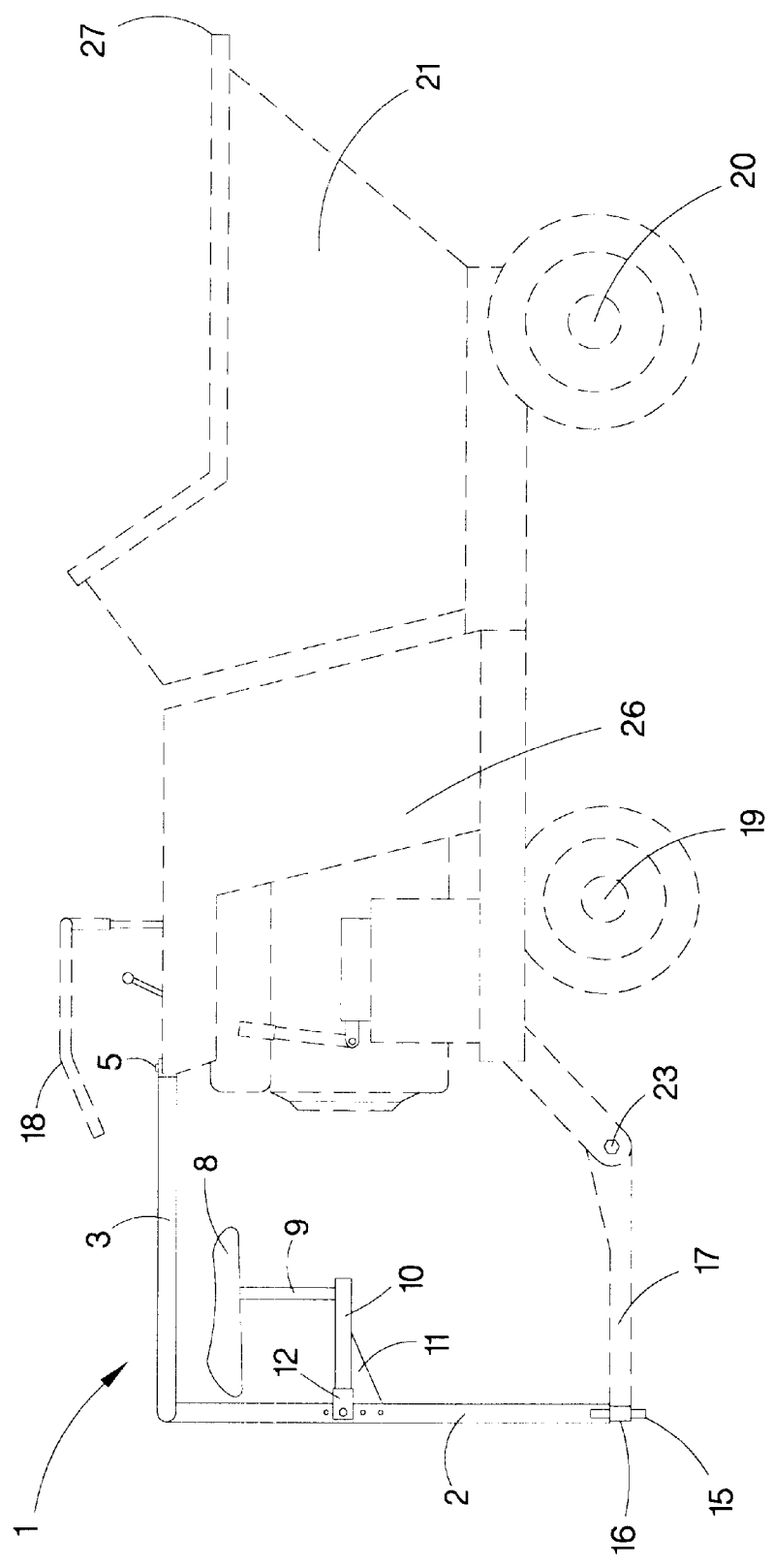
FIG. 4 is a side view of the protector and exemplary concrete buggy.

Referring simultaneously to FIGS. 2, 3 and 4, a typical concrete buggy upon which the inventive protector 1 may be installed is shown in ghost. Such typical buggy has a concrete bin 21, forward drive wheels 20, a rearward steering wheel 19 which is manually turnable by handle bars 18, and a protective cowl 26. Such exemplary concrete buggy also typically has a rearward rider step 17, such step typically having pivot joints 23 allowing step 17 to compactly pivot upwardly while the buggy is not in use.

Referring to FIG. 3, the concrete buggy operator protector 1 may be installed upon the exemplary concrete buggy by sliding slip pins 6 and 7 downwardly through slip pin receiving apertures 25 and 24, and by simultaneously sliding slip pins 15 downwardly through slip sleeves 16.

Referring to FIG. 2, upon installation of the protector 1, as depicted, an operator may stand upon the upper surface of rider step 17 between the left and right arms of "U" bracket 3. In the event another concrete buggy, lining up the rear of the buggy depicted, drives into the buggy depicted, the front lip 27 of the bin 21 of the rearward buggy will impact against impact column 2, allowing such column to protect the operator from injury.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A concrete buggy operator protector comprising:

a) a "U" bracket having a rearward end, a left arm, and a right arm, the left and right arms each having a forward end, the rearward end of the "U" bracket in combination with the left and right arms defining an operator protection space;

b) cowl mounting means fixedly attached to the forward ends of the left and right arms of the "U" bracket;

c) at least a first impact column fixedly attached to and extending downwardly from the rearward end of the "U" bracket; and, d) step mounting means fixedly attached a lower end of the at least first impact column.

2. The concrete buggy operator protector of claim 1 wherein the cowl mounting means comprises left and right slip pins.

3. The concrete buggy operator protector of claim 2 wherein the step mounting means comprises at least a third slip pin.

4. The concrete buggy operator protector of claim 1 wherein the cowl mounting means comprises a disconnectable fastener.

5. The concrete buggy operator protector of claim 1 wherein the step mounting means comprises a disconnectable fastener.

6. The concrete buggy operator protector of claim 2 further comprising an operator's seat fixedly attached to and extending forwardly from the at least first impact column.

7. The concrete buggy operator protector of claim 3 further comprising an operator's seat fixedly attached to and extending forwardly from the at least first impact column.

8. The concrete buggy operator protector of claim 4 further comprising an operator's seat fixedly attached to and extending forwardly from the at least first impact column.

9. The concrete buggy operator protector of claim 5 further comprising an operator's seat fixedly attached to and extending forwardly from the at least first impact column.

10. The concrete buggy operator protector of claim 6 wherein the operator seat is further vertically adjustably attached to the at least first impact column.

11. The concrete buggy operator protector of claim 7 wherein the operator seat is further vertically adjustably attached to the at least first impact column.

12. The concrete buggy operator protector of claim 8 wherein the operator seat is further vertically adjustably attached to the at least first impact column.

13. The concrete buggy operator protector of claim 9 wherein the operator seat is further vertically adjustably attached to the at least first impact column.

* * * * *